Jan. 25, 1966   J. W. GIFFEN   3,231,356
APPARATUS FOR FORMING GLASS ARTICLES
Filed April 20, 1962   3 Sheets-Sheet 3
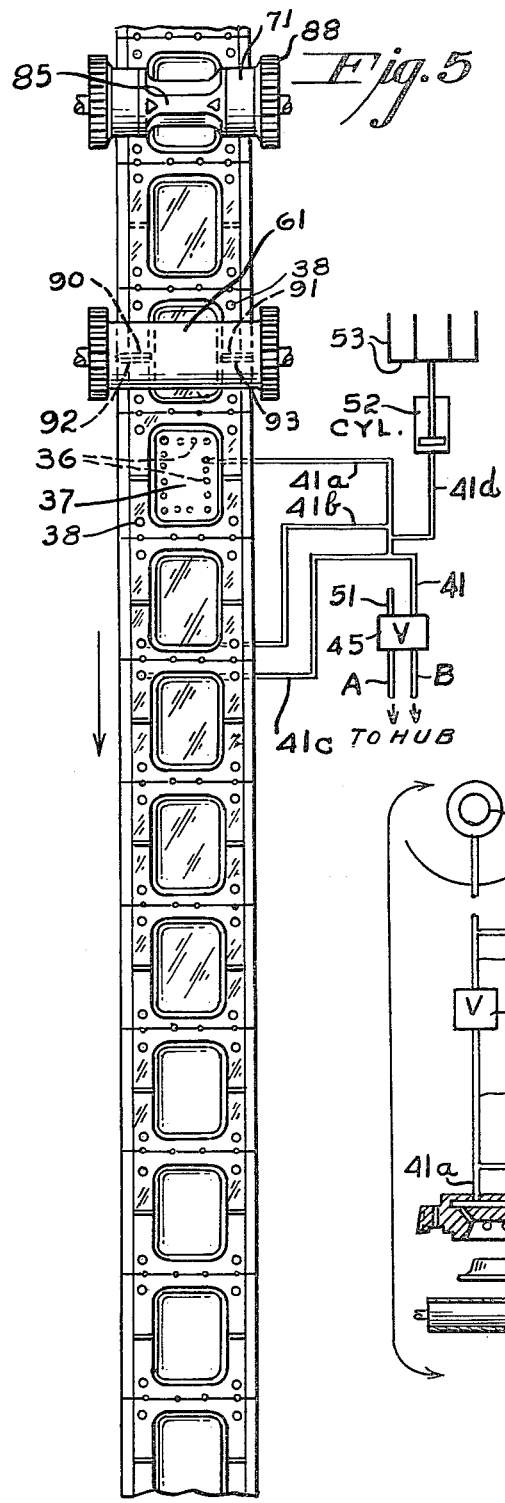
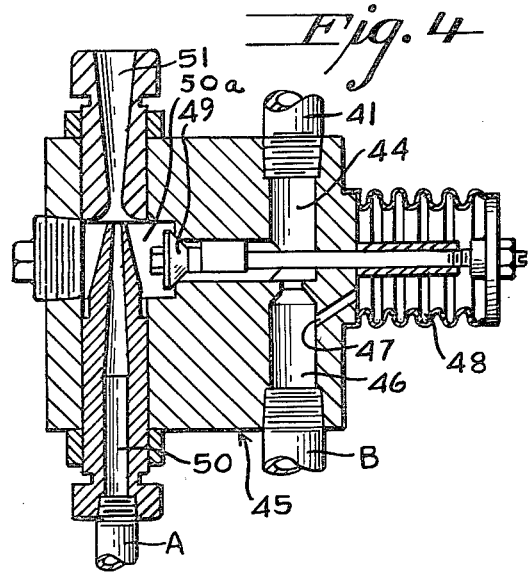
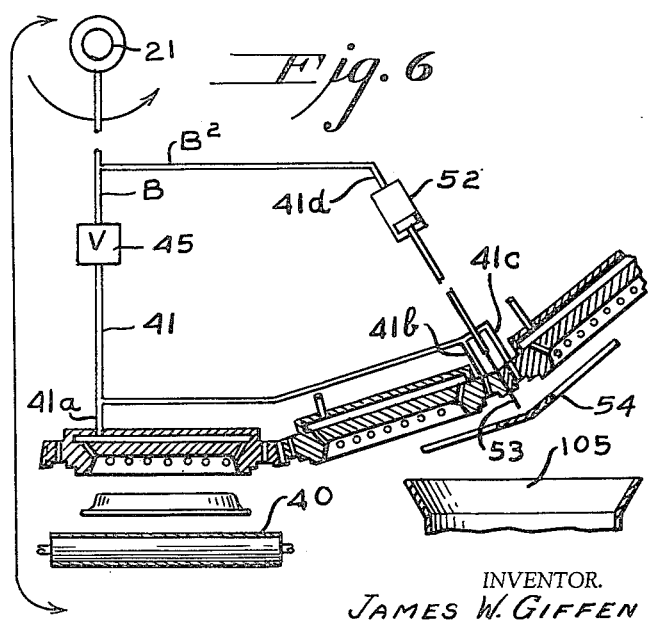
INVENTOR.
JAMES W. GIFFEN
BY
Clarence R. Patty Jr.
ATTORNEY

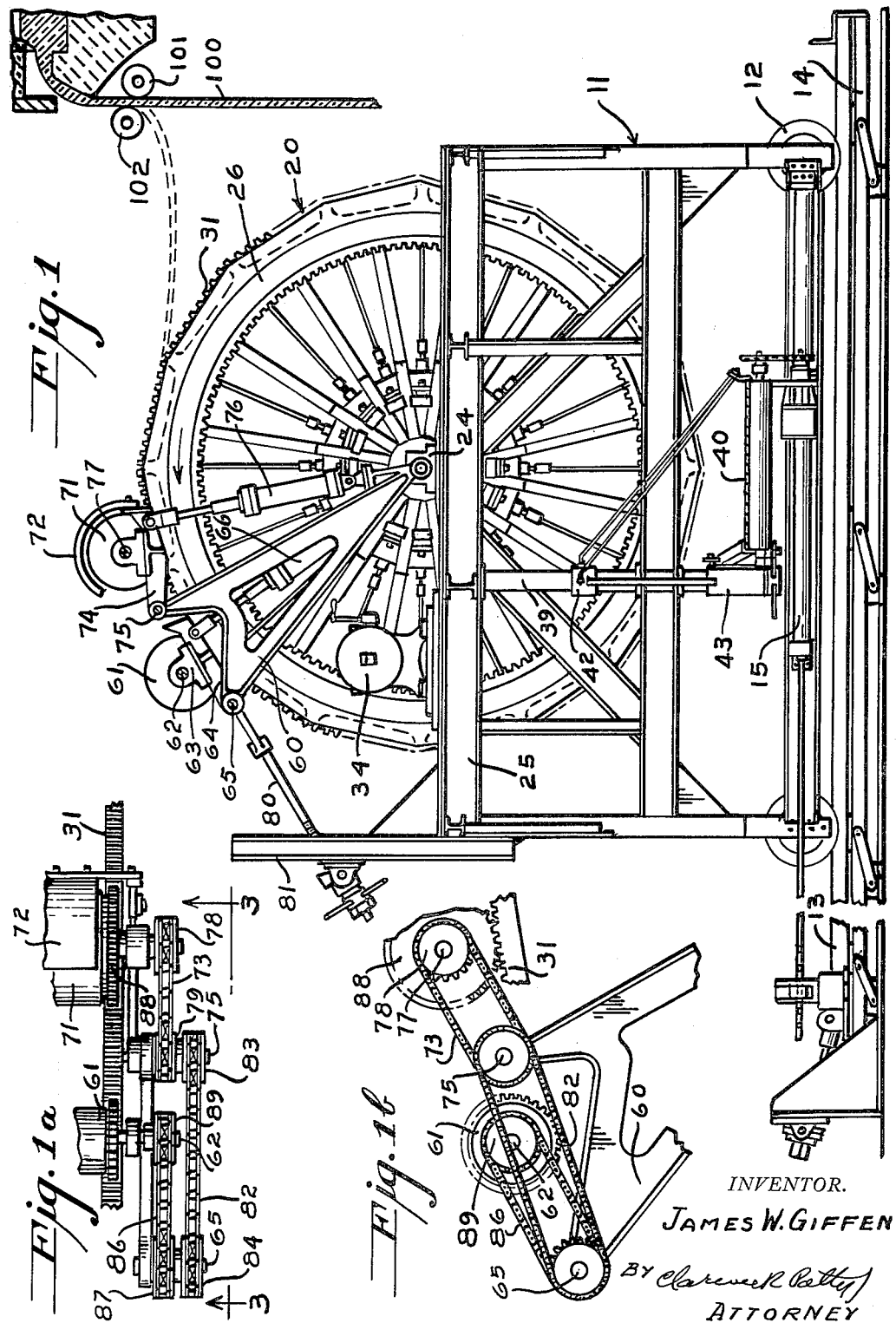

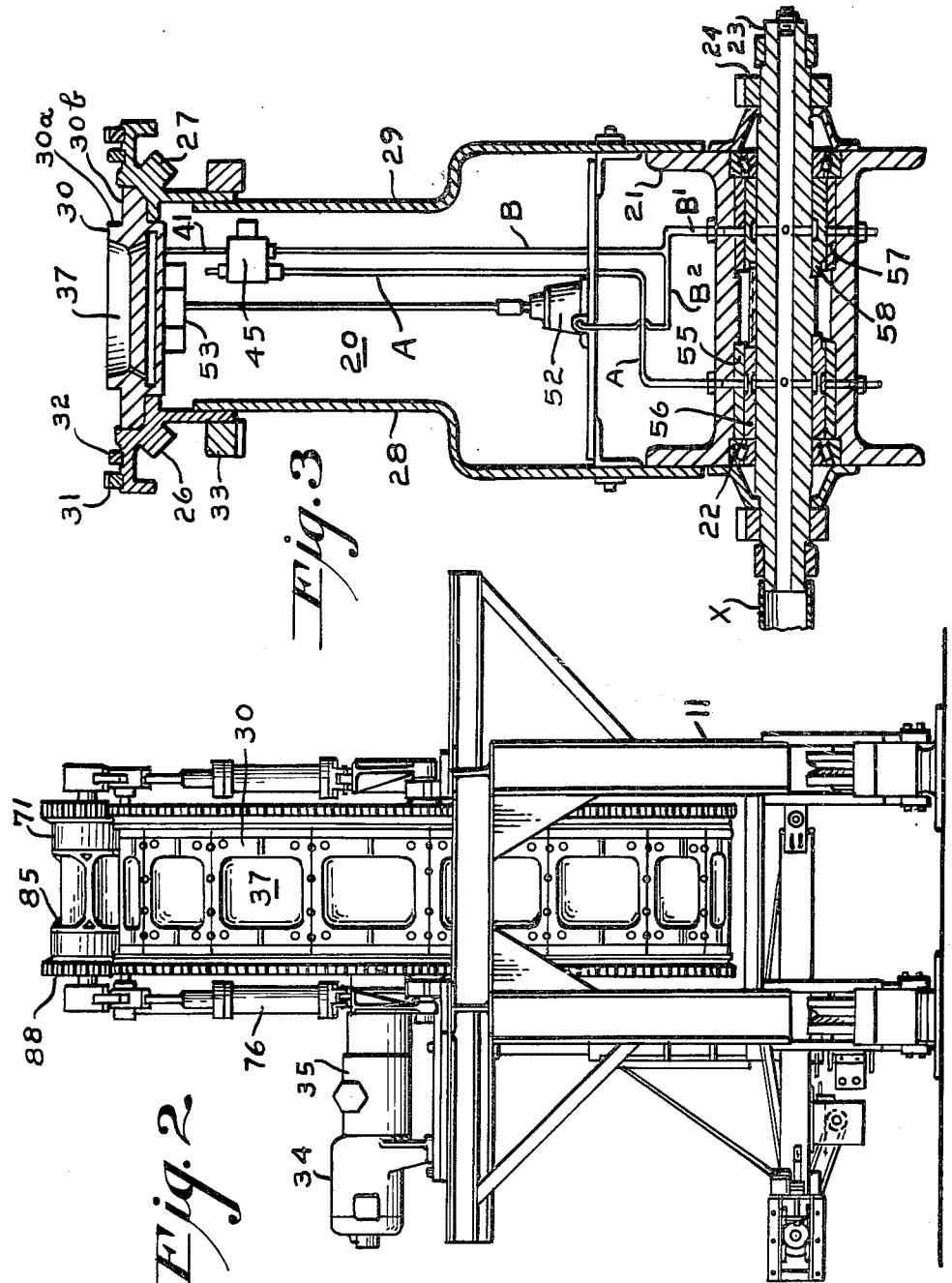

United States Patent Office 3,231,356
Patented Jan. 25, 1966

3,231,356
APPARATUS FOR FORMING GLASS ARTICLES
James W. Giffen, Corning, N.Y., assignor to Corning Glass Works, Corning, N.Y., a corporation of New York
Filed Apr. 20, 1962, Ser. No. 189,145
6 Claims. (Cl. 65—184)

The present invention relates to apparatus for forming glass articles from a sheet or ribbon of molten glass stock and particularly to a system wherein formation of articles is effected during the continuous travel of the ribbon toward a cullet receiving station.

According to the invention a turret mounted for rotation about a horizontal axis has a series of open topped molds arranged about its perimeter. A continuously formed sheet or ribbon of molten glass stock is trained over these molds when in their upward facing position. As the turret rotates the sheet advances between shearing cavity entrance bordering edges of the mold walls and a roller under which the molds travel having shear blades arranged thereabout which progressively and successively become registered in shearing relation with cavity bordering walls of such molds to shear stock over their cavities from a web of stock remaining on mold surfaces surrounding their cavity entrance bordering walls. A subsequently encountered roller has shear blades cooperative with shear blades on surfaces on two opposite sides of each mold to transversely sever such web of stock into sections. As the turret rotates suction is created within the mold cavities and within cavities in its mold surfaces laterally thereof to form articles within the mold cavities and to hold the sectionalized webs of stock to such surfaces respectively.

When a mold reaches an article unloading position pressure is substituted for suction to aid in the removal of an article from its mold. In the particular embodiment of the invention shown such pressure is substituted for vacuum as the mold attains an inverted position and the article drops onto a delivery conveyer. As the mold travels a predetermined distance beyond the unloading position pressure is created in the cavities in the surfaces laterally of adjoining mold halves to free the web section from such surfaces. At the same time the web section is mechanically engaged to aid in its removal from such surfaces and it falls by gravity into a suitable cullet chute.

In the accompanying drawings FIG. 1 is a side elevational view of a machine embodying the invention showing means for supplying a molten sheet of glass thereto, with certain parts omitted therefrom for the sake of clarity.

FIG. 1a is a top plan view, on an enlarged scale, of a fragment of a machine including parts omitted from the showing in FIG. 1.

FIG. 1b is a view taken on line 3—3 of FIG. 1a.

FIG. 2 is a view of the right-hand end of the machine shown in FIG. 1.

FIG. 3 is an axial sectional view of part of the machine on an enlarged scale with certain parts omitted.

FIG. 4 is a sectional view of one of a plurality of like valved assemblies embodied in the machine.

FIG. 5 is a diagrammatic straight line view illustrating a number of molds of the machine and fluid paths to the molds, and the shearing rollers under which such molds pass.

FIG. 6 is a further diagrammatic view supplementing the showing of FIGS. 3–5.

Referring to the drawings in detail, as will be seen the forming apparatus is embodied in a wheeled carriage 11 whose wheels such as 12 rest on a section of track embodying rails such as 13 carried on an elevatable platform 14. Two pneumatic cylinders such as 15 arranged on opposite sides of the turret are provided to facilitate movement of the carriage 11 between opposite ends of the track.

A turret 20 having a tubular hub 21 (FIG. 3) is rotatable on suitable bearings such as 22 about a tubular shaft 23 supported in pillow blocks such as 24 arranged on horizontal beams such as 25 of the carriage 11. It will be understood shaft 23 remains in a static position except for timing adjustments.

A belt conveyor 40 is arranged below the turret 20 transversely thereto and is supported primarily from a vertical post 39 of the carriage 11, by means of suitable collars 42 and 43 which may be turned about such post to, when desired, swing the conveyor from under the turret.

As can best be seen in FIG. 3, the turret 20 embodies laterally spaced rims 26 and 27 supported about the hub 21 through the medium of a plurality of spokes such as 28 and 29. Rims 26 and 27 are polygonal and are bridged by molds such as 30. Each rim 26 and 27 is also surrounded with gear racks such as 31 joined with one another to form a polygonal ring gear about each rim with the pitch line of the racks 31 being in substantially the plane of the trim line of the molds therebetween. Also secured about each rim between the ring gears formed by racks 31 and the molds such as 30 is a polygonal roller guide rail such as 32 about each rim.

Arranged on rim 26 concentric to hub 21 is an internally toothed ring gear 33 for effecting rotation of the turret. Rotary motion is imparted to the turret 20 through the medium of a pinion (not shown) in mesh with gear 33 and driven by a motor 34 (FIGS. 1 and 2) through the medium of a variable speed gear reduction unit 35.

Each mold such as 30 has an article forming cavity 37 having a top entrance bordered by a wall having a vertically disposed surface 30a (FIG. 3) and a surrounding horizontally disposed ribbon or sheet web supporting surface 30b provided with web retaining cavities such as 38 (FIG. 5). Passages 36 in the molds 30 are in communication with mold cavities 37 and web retaining cavities 38 via passages terminating in the bottoms of their cavities, extending to a valved eductor assembly 45. As will be apparent from the showing in FIG. 5 a line 41 from assembly 45 has branches 41a, 41b, and 41c extending to the cavity 37 of one mold and to the oppositely disposed surface cavities such as 38 of two subsequent adjoining molds. A branch 41d also extends to a cylinder such as 52 whose piston rod carries a fork 53 projectable, when fluid is supplied to such cylinder, through passages at the junction of such two adjoining molds as illustrated in FIG. 6, to engage a bridging web of glass such as 54 to mechanically eject it from association with its supporting surfaces. Assembly 45 is designed to educt fluid from the respective cavities, such as 37 and 38, and to alternatively supply fluid thereto and to cylinder 52 as occasion requires.

Assembly 45 corresponds to that covered by copending Giffen application Serial No. 157,117 filed December 5, 1961, now Patent No. 3,181,563. Such assembly has an input passage 46 in direct communication with its passage 44 and a branch passage 47 leading into the interior of a bellows walled chamber 48 into which air may be directed to tightly seat a valve 49 to close communication between a space 50a in the assembly and passages 44 and 46. Passages 50 and 46 are connected to the bore of hub 21 (FIG. 3) through suitable passages therethrough via lines such as A, B and B1 and by way of suitably channeled air distributing sleeves 55 and 57 lining the bore border surfaces of the hub and fixed thereto and similar sleeves 56 and 58 surrounding oppositely disposed regions of the tubular shaft 23 and fixed thereto. A branch B2 of B1 also connects with cylinder 52. As will be understood sleeves 56–58 are so channeled as to supply air to lines such as A and B1 successively as the turret rotates at desired times from air supplied to the bore of hub 21 from an air supply line X.

Pivoted from the ends of shaft 23 are two brackets such as 60 (FIG. 1) whose outward ends are bridged by a web shearing roller 61 carried on a shaft 62 whose ends pass through pillow blocks such as 63 mounted on arms such as 64. The arms such as 64 are pivoted about stub shafts such as 65 to the brackets such as 60 and each at its other end is linked to one end of a fluid operated unit such as 66. The other ends of the units such as 66 are secured to the brackets 60. As will be appreciated the arrangement permits swinging movements of roller 61 about shafts such as 65 into and out of association with a mold such as 30 (FIG. 3) carried by turret 20.

A roller 71, for shearing the web of glass bordering a mold is supported in substantially the fashion as is roller 61, on arms such as 74, pivoted to bracket 60 by a stub shaft 75 and is supported at its opposite ends by one end of a fluid operated unit 76 whose other end is secured to a portion of bracket 60. Means is thus provided for swinging the roller 71 into and out of association with a mold such as 30. An arcuate shaped box 72 partly surrounds roller 71 through which a roller cooling fluid may be circulated. An adjustable linkage 80 extends between the outer ends of the brackets such as 60 and an upright member 81 of the carriage to enable the arcuate position of rollers 61 and 71 to be adjusted for timing if found desirable.

The roller 71 has formed about its cylindrical boundary, shear blades such as 85 (FIGS. 2 and 5) that progressively slide down over the wall surface 30a (FIG. 3) of a mold such as 30 passing thereunder to shear the portion of a ribbon or sheet of molten glass arranged over the mold cavity from the web portion thereof extending in all directions laterally of its surface 30a. The roller 71 is maintained in exact lateral registry with the mold by the guide rails such as 32 (FIG. 3) and circumferentially of the turret by gears such as 88 (FIG. 2) in mesh with racks 31 of the ring gear about the periphery of the turret 20.

As shown in FIG. 5 the web shearing roller 61 is provided with shear blades 90 and 91 cooperative with shear blades such as 92 and 93 embodied in the surfaces of a mold laterally of its cavity and is maintained in proper registry with the mold shear blades in the same manner that registry is maintained between roller 71 and a mold.

As depicted in FIGS. 1a and 1b the rollers 61 and 71 are provided with a chain drive between them which permits either roller to be elevated to a position in which its drive gears are out of mesh with the racks 31 to effect continued rotation of either by the other to maintain its phase relationship with such rack while its drive gear is disassociated therefrom. Such drive embodies a chain 73 trained about sprocket wheels 78 and 79, a second chain 82 trained about sprocket wheels 83 and 84 and a third chain 86 trained about sprocket wheels 87 and 89.

Operation of the machine may be briefly described as follows: with the turret 20 rotating in a counterclockwise direction a molten ribbon or sheet of glass 100 issuing from between suitable forming rolls 101 and 102 is trained over the turret, the carriage in the meantime being moved to its rightward position to bring the turret under rolls 101. Conveniently the rollers 71 may be elevated while training the ribbon over the turret. As soon as the ribbon is trained over a mold, such as 30, the assemblies such as 45 in communication with cavities such as 37 and 38 create suction in such cavities to form an article and cause the web of glass surrounding surface 30a to firmly cling to surface 30b. As a mold passes under the roller 71 one of its shear blades such as 85 progressively passes over mold surface 30a in shearing relation therewith to sever the web of glass surrounding such surface from that arranged over the cavity 37.

As such mold progresses further it passes under roller 61 which transversely shears the web of glass cullet surrounding the mold. As will be seen therefore the ribbon of glass after having removed therefrom those portions utilized in forming articles is transversely severed into web sections each surrounding one-half of two adjoining molds. As a mold arrives at an article takeout position, in the illustrated structure when the article is inverted, the assembly such as 45 in communication with such mold directs air into its cavity 37 to free the article therefrom. With the mold in an inverted position it is arranged over the conveyor 40 onto which it falls by gravity. At such time the two adjoining molds that have been advanced an angular distance of approximately 44° and 22° respectively beyond their inverted positions have the cavities of their adjoining surfaces such as 38 supplied with air to free the web of glass such as 54 bridging them therefrom. Also at the same time such assembly supplies air to cylinder 52 which thrusts the fork 53 into engagement with such web of glass to mechanically disengage it from such surfaces causing it to fall by gravity into a cullet chute such as 105.

Although the machine as illustrated and described by way of example is arranged to postpone application of pressure to effect release of a formed article until it arrives at an inverted position where gravity aids pneumatic pressure in its removal from the mold; by simple modification of the ports in the hub of the machine this operation may be effected at any desired rotary position after formation of the article. The article under such circumstances may be removed from the mold by a take-out mechanism, such for example as that shown and described in applicant's co-pending application Serial No. 189,044 filed on even date herewith, now Patent No. 3,145,824, and the webs of glass removed at any desired time thereafter in the manner already described.

What is claimed is:

1. In a glass working machine, a turret rotatable about a horizontal axis and upon the rim of which a molten sheet of glass stock is trained, molds arranged substantially adjacent one another in a circular row about the turret rim having radially facing cavity entrance bordering walls within the lateral confines of the rim, means for creating suction in the mold cavities to conform the stock of the sheet thereover into articles of the contour of the mold cavity, glass support surfaces laterally of the mold cavities having cavity openings therein, means to create suction in such support surface cavities to retain the stock on such glass support surfaces adhered thereto, roller means mounted adjacent the turret rim cooperatively rotatable in engagement with the mold cavity bordering walls as the turret is being rotated for separating the stock over the molds from a web of stock remaining laterally thereof on such surfaces, rotatable shear means mounted adjacent the turret rim for transversely severing such web of stock remaining on opposite sides of said mold cavities into sections in those regions laterally of the respective mold cavities, means for creating positive pneumatic pressure within the mold cavities to free articles from the molds, and means arranged between adjacent molds for disengaging the web sections of stock adjoining halves of such adjacent molds.

2. A glass working machine which comprises, a turret rotatable about a horizontal axis, a plurality of radially outwardly open hollow molds arranged about the rim of said turret and each having a mold cavity entrance bordering wall surrounded by a glass ribbon supporting surface, ribbon retaining cavities formed in said supporting surface, means for training a molten ribbon of glass stock over said molds and over said supporting surfaces surrounding such molds as said molds move along an endless circular path, means for creating suction in each mold cavity to conform the glass stock thereover into the contour of such cavity and for creating suction in said ribbon retaining cavities for retaining the glass stock supplied to said supporting surfaces thereon, roller means for severing the web of glass stock surrounding such bordering walls from that arranged immediately over said mold cavity as the turret rotates, means for transversely severing the ribbon web laterally of each mold cavity as it moves further along its circular path, fluid pressure means for effecting the removal of articles formed in the mold cavities and fluid actuated means for effecting the removal of the webs of glass surrounding the mold cavities from said glass supporting surfaces.

3. A machine for forming hollow glass articles which comprises, a series of connected molds having upwardly open mold cavities, supporting surfaces formed on said molds surrounding said upwardly open mold cavities, means for supplying a sheet of molten glass over said molds as they are continuously moved along a closed path, means communicating with said mold cavities for vacuum forming portions of the molten sheet of glass trained thereover into articles shaped to the contour of the mold cavities and for pressure ejecting formed articles from such cavities, said supporting surfaces receiving portions of the sheet projecting beyond the mold cavities, passage means communicating with said supporting surfaces for both withdrawing air from such surfaces to suction-retain the overlying sheet upon such supporting surfaces and for supplying air to such surfaces to remove such overlying sheet therefrom, means for separating the articles formed in the mold cavities from the portions of the sheet projecting therebeyond, means for transversely severing such projecting portions adjacent each mold cavity into sections, and fluid conduit means communicating with both the mold cavity of one mold and the passage means of an adjacent mold for simultaneously ejecting an article from said one mold cavity and a section of said projecting portion from said adjacent mold.

4. Glass working apparatus comprising, a turret mounted for rotation about a horizontal axis, a plurality of molds arranged in uniformly spaced relation about the periphery of said turret; each mold having a radially-outwardly open cavity bounded by a bordering wall terminating at its upper extent adjacent the cavity entrance, and spaced-apart shear blades extending laterally across said mold on opposite sides of said mold cavity; means for rotating said turret and moving the molds thereon along a circular path, means for delivering a molten ribbon of glass stock onto the top of said molds as the turret rotates, means for vacuum forming that portion of the ribbon overlying the mold cavities into an article having the mold cavity configuration, a first cylindrical roller operatively connected to said apparatus and having its face contoured to complement the top of said cavity entrance bordering walls, means for rotating said turret and said first roller to progressively engage the cavity entrance bordering walls of said molds with the contoured cylindrical surface of said roller as the roller and turret are rotated to shear stock of the molten ribbon projecting externally of said cavity entrance bordering walls from that arranged over the mold cavities, projecting support portions surrounding said mold cavities for supporting the molten ribbon projecting externally of said cavity entrance bordering walls, and a second roller operatively connected to said apparatus and provided with discontinuous transverse shear blades rotatable in cooperative engagement with the spaced-apart shear blades carried by said molds to laterally sever the stock on opposite sides of each of said mold cavities.

5. Apparatus for vacuum forming articles from molten vitreous sheet material comprising, a turret arranged for rotation about a horizontal axis having an outer rim, a series of molds arranged about the rim of said turret having outwardly facing cavities, glass stock supports surrounding said mold cavities, means for continuously rotating said turret and said molds through a circular path, means for spreading a sheet of molten vitreous material over said mold cavities and said supports as the turret conveys them through an upright position, means for vacuum forming that portion of the sheet material overlying the mold cavities into articles conforming to the shape of such mold cavities, first roller shearing means mounted on said apparatus adjacent said turret and synchronized with the rotation of said turret for shearing that portion of the sheet outside the boundaries of the mold cavities from the formed sheet within such boundaries as the turret rotates, second roller shearing means mounted on said apparatus adjacent said turret and synchronized with the rotation of said turret for transversely shearing the web of sheet material remaining on said supports laterally of each mold cavity into sections as the turret rotates, and means for separately ejecting the formed articles and the remaining web sections of such sheet material from said molds.

6. A glass working machine comprising a turret rotatable about a horizontal axis and having a plurality of closely spaced molds provided with radially-outwardly open mold cavities arranged about its rim, means for training a continuous sheet of molten glass stock upon the open face of said molds as the turret rotates, means for vacuum forming the glass stock overlying each of said mold cavities into an article, means for shearing the formed article in each mold cavity from a surrounding web of glass stock; and roller means mounted on said machine adjacent the rim of said turret and having discontinuous blade portions thereon rotatable in cooperative timed relation with said turret for transversely severing the surrounding web laterally of each mold cavity into sections while the formed glass article is retained within such cavity to thereby facilitate the removal of such surrounding web from the turret separately of such formed article.

References Cited by the Examiner

UNITED STATES PATENTS

| | | | |
|---|---|---|---|
| 742,899 | 11/1903 | Page et al. | 65—185 |
| 760,667 | 5/1904 | Walsh | 65—185 |
| 775,204 | 11/1904 | Cheesman | 65—176 |
| 1,236,937 | 8/1917 | Hough | 65—106 |
| 1,548,445 | 8/1925 | Carl | 65—176 |
| 1,589,654 | 6/1926 | Murdock | 65—184 X |
| 2,023,781 | 12/1935 | Cramer | 65—184 X |
| 2,352,957 | 7/1944 | Kell | 65—106 X |
| 2,433,013 | 12/1947 | Ziegler | 65—39 |
| 2,807,121 | 9/1957 | Hamilton | 65—184 X |
| 2,970,405 | 2/1961 | Giffen | 65—55 |
| 3,126,583 | 3/1964 | Haberle | 18—21 |

FOREIGN PATENTS

| | | |
|---|---|---|
| 671,772 | 5/1952 | Great Britain. |

DONALL H. SYLVESTER, *Primary Examiner.*